US008527611B2

(12) United States Patent
Chennikara-Varghese et al.

(10) Patent No.: US 8,527,611 B2
(45) Date of Patent: Sep. 3, 2013

(54) TRANSPARENT SERVICE ADAPTATION IN HETEROGENEOUS ENVIRONMENTS

(75) Inventors: Jasmine Chennikara-Varghese, Somerset, NJ (US); Harshad Tanna, Princeton, NJ (US); Wai Chen, Parsipanny, NJ (US); Onur Altintas, Kanagawa-ken (JP); Yoshihisa Suwa, Nagoya (JP); Shengwei Cai, Florham Park, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 983 days.

(21) Appl. No.: 11/135,169

(22) Filed: May 23, 2005

(65) Prior Publication Data

US 2006/0034222 A1      Feb. 16, 2006

Related U.S. Application Data

(60) Provisional application No. 60/600,977, filed on Aug. 12, 2004.

(51) Int. Cl.
*G06F 15/177*       (2006.01)
(52) U.S. Cl.
USPC .......................................... 709/220; 370/371
(58) Field of Classification Search
USPC ........................................................ 709/220
See application file for complete search history.

(56) References Cited

U.S. PATENT DOCUMENTS

| | | | |
|---|---|---|---|
| 6,137,791 A | 10/2000 | Frid et al. | 370/352 |
| 6,160,804 A | 12/2000 | Ahmed et al. | 370/349 |
| 6,201,962 B1 * | 3/2001 | Sturniolo et al. | 455/432.2 |
| 6,408,232 B1 * | 6/2002 | Cannon et al. | 701/29 |
| 6,496,505 B2 | 12/2002 | La Porta et al. | 370/392 |
| 6,662,011 B1 | 12/2003 | Sale et al. | 455/428 |
| 6,768,726 B2 | 7/2004 | Dorenbosch et al. | 370/331 |
| 6,785,256 B2 | 8/2004 | O'Neill | 370/338 |
| 6,832,087 B2 | 12/2004 | Gwon et al. | 455/436 |
| 2002/0082015 A1 * | 6/2002 | Wu | 455/436 |
| 2002/0103934 A1 * | 8/2002 | Fishman et al. | 709/246 |
| 2004/0198386 A1 * | 10/2004 | Dupray | 455/456.1 |
| 2006/0205423 A1 * | 9/2006 | Blair et al. | 455/512 |
| 2007/0021117 A1 * | 1/2007 | McKenna et al. | 455/431 |

OTHER PUBLICATIONS

Henning Schulzrinne et al, "Application-Layer Mobility Using SIP", ACM SIGMOBILE Mobile Computing and Communications Review, vol. 1, No. 2, pp. 1-9.
Sundt Roy et al, "Application Level Hand-Off Support for Mobile Media Transcoding Sessions", *NOSSDAV'02*, May 12-14, 2002, Miami, Florida, U.S.A.

(Continued)

*Primary Examiner* — Phuoc Nguyen
*Assistant Examiner* — June Sison
(74) *Attorney, Agent, or Firm* — Philip J. Feig

(57) ABSTRACT

A method of tailoring data streams transmitted to networked user devices is disclosed in which environment information associated with each device is stored at an agent located on those devices. This environment information may include information related to the hardware, interface and application capabilities of the particular device. In another embodiment, this environment information is transmitted and stored at an agent at a local network gateway. And in another embodiment, the environment information is then stored at a mirror agent located in a backbone network of a service provider. By referring to this environment information, a service provider can tailor the transmission of data streams, such as multimedia streams, to a device based on the capabilities of the device and the associated network.

9 Claims, 5 Drawing Sheets

(56) References Cited

OTHER PUBLICATIONS

Henry Song et al, "Browser Session Preservation and Migration", World Wide Web Conference 2002.

Binh Thai et al, "Integrated Personal Mobility Architecture: A Complete Personal Mobility Solution", Mobile Networks and Applications, 8, 27-36, 2003, Kluwer Academic Publishers.

Mark H. Butler, "Using Capability Profiles for Appliance Aggregation", International Workshop on Networked Appliances, pp. 1-6, Oct. 2002.

Thai-Lai Pham et al, "Composite Device Computing Environment: A Framework for Augmenting the PDA Using Surrounding Resources", Proceedings on Workshop in Situated Interaction in Ubiquitous Computing, 2000.

* cited by examiner

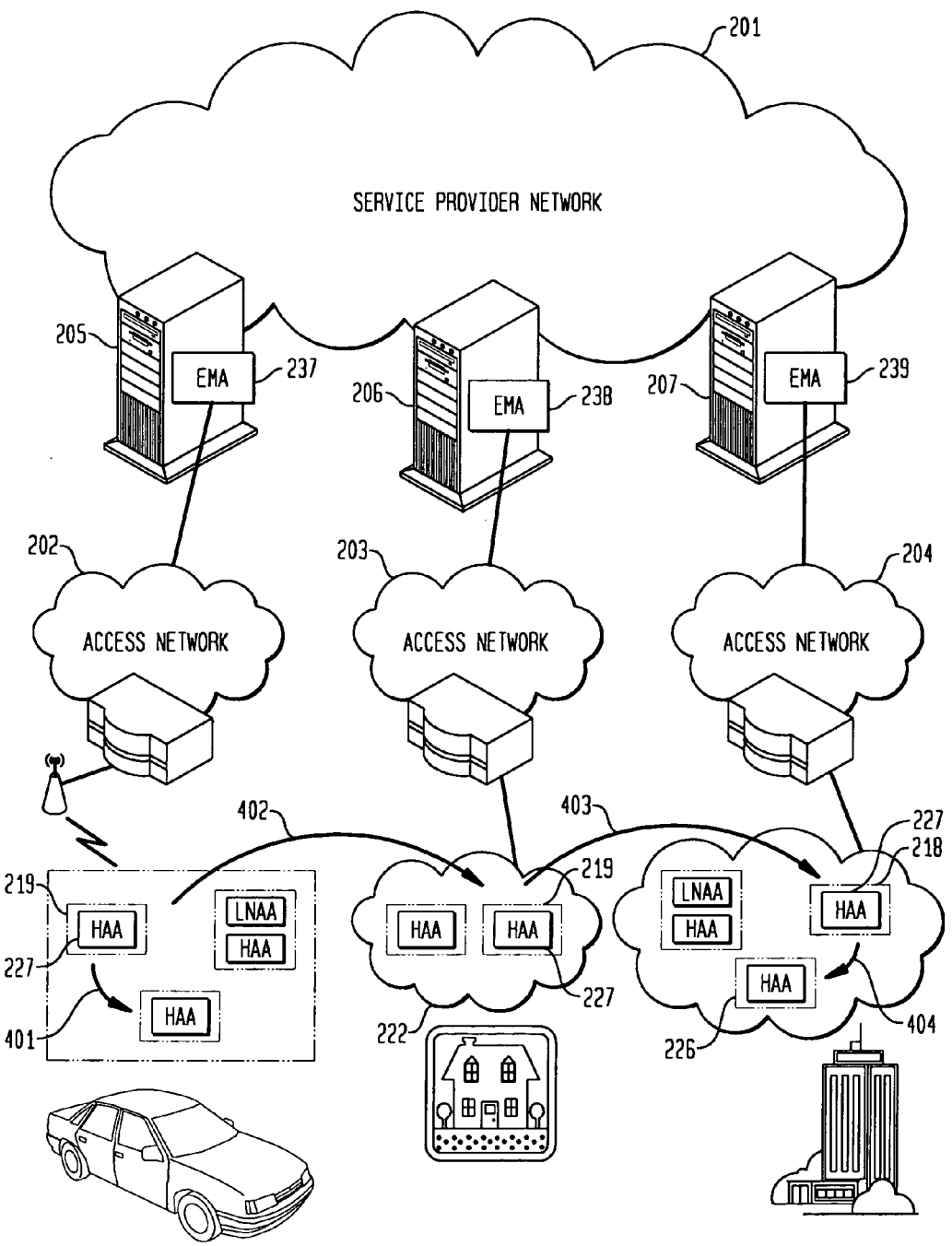

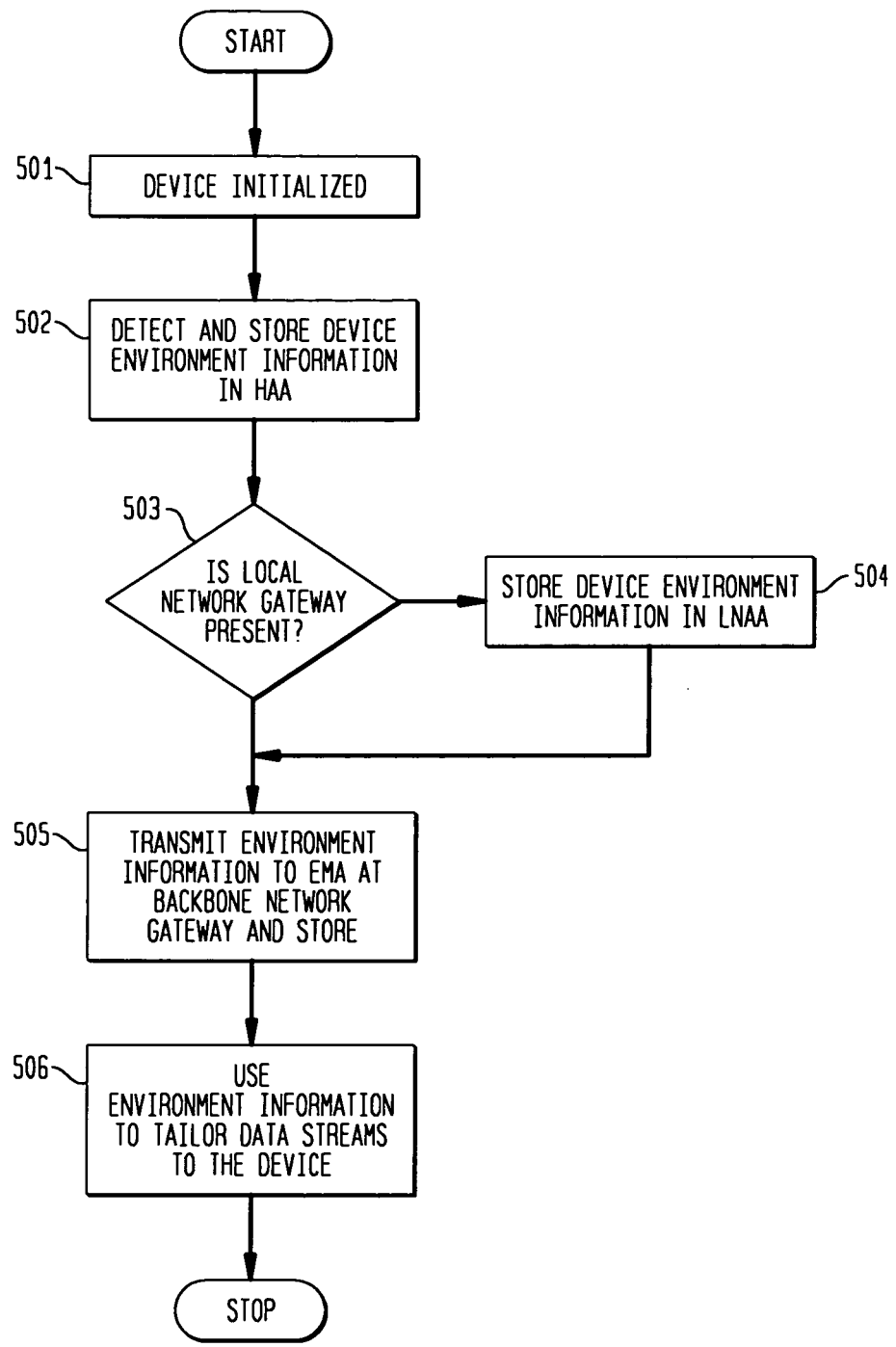

TRANSPARENT SERVICE ADAPTATION IN HETEROGENEOUS ENVIRONMENTS

This application claims the benefit of U.S. Provisional Application No. 60/600,977, filed Aug. 12, 2004, which is hereby incorporated herein by reference.

BACKGROUND OF THE INVENTION

The evolution of mobile networks has driven service providers to develop increasingly complex and value-added network services. The next generation of mobile users will be able to connect to these network services through a variety of devices (e.g., mobile phones, laptop computers, Personal Digital Assistant (PDA), etc.) via multiple access networks (e.g., 802.11, Code Division Multiple Access (CDMA), Global System for Mobile Communications (GSM), cable, Digital Subscriber Line (DSL), etc). As the use of such varied device to access services via such access networks grows, it becomes important to ensure that these devices and networks work cooperatively together. For example, transfers (handoffs) of active communications sessions from one device to another and/or from one access network type to another will become increasingly desirable. Due to the increasing variety of protocols and message handling capabilities supported by different devices and networks, such transfers may present new problems. For example, some devices (e.g., cellular telephones, PDAs) will not be able to support the same data rate as a device with more processing capabilities (e.g., a laptop computer). As such, the tailoring of ongoing application sessions, for example active communication sessions between a service provider and a device, to accommodate the capabilities of the different devices/networks will become increasingly important.

User device capabilities do not need to be limited to an individual device. For example, while it is possible to perform many tasks on a single device, the availability of other devices can improve the services provided to a user. Therefore, as is well known, Personal Access Networks (PAN) have been developed that allow a user to cooperatively utilize a number of devices which are locally networked to support the user session. For example, a display device in an automobile may be part of a PAN having a cellular telephone with a broadband wireless internet connection. The information received via the internet connection may be displayed on the display device in the automobile. As such Personal Area Networks become increasingly popular, the capability to support transferring of an application session from a single device to distributing the same application session over several devices within a local network will become important.

Existing methods of handoffs have been used in transferring a data communication session between devices and/or networks. For example, well-known cellular hand-off technology and Mobile IP techniques function to maintain a communication session as devices change networks and/or obtain new IP addresses. Thus, communications are maintained transparently with no loss in data as a terminal changes access networks. However, while these techniques allow changes of networks, they do not support handoffs between devices. In another prior attempt, networks using Voice over IP (VoIP) protocols, such as the well-known Session Initiation Protocol (SIP), allow users to change terminals and networks while in a real-time communication session. However, these VoIP protocols typically simply transfer or redirect a call from one device/terminal to another based on the IP address of the terminal. There are provisions in these protocols to take into account device capabilities and configuration to modify the communication session content in a way such that it is tailored to a particular device. However, SIP is typically targeted for only real-time applications. In addition, SIP cannot handle distribution of an application to multiple devices.

SUMMARY OF THE INVENTION

While the prior methods of accomplishing handoffs from one network or device to another network or device are advantageous in many aspects, they are limited in certain regards. Specifically, as discussed above, these handoffs do not take into account the configuration of a device to tailor the communication session to the capabilities of the device and support the capability to distribute a single application session among multiple devices.

The present invention substantially overcomes this limitation. In one illustrative embodiment, environment information associated with a device is stored at an agent located on that device. This environment information may include information related to the hardware, interface and application capabilities of the device. In another embodiment, this environment information is transmitted and stored at an agent at a local network gateway to support distribution of a single application session among multiple devices. In another embodiment, the environment information is stored at a mirror agent located in a backbone network of a service provider. By referring to this environment information, a service provider can tailor the transmission of data streams, such as multimedia streams, to a device based on the capabilities of the device or devices and the associated network.

In one embodiment, an agent referred to herein as a Home Adaptation Agent is located on a user device and collects configuration information for that device. This information may include, illustratively, information regarding the hardware configuration, network capabilities and application capabilities for the device. In another embodiment, when the device enters a local network, the information collected by the Home Adaptation Agent is transferred to another agent located at a local network gateway, referred to herein as a Local Network Adaptation Agent. The Local Network Adaptation Agent, for example, collects configuration information for that device as well as other devices within the local network. In yet another embodiment, the information collected by an Home or Local Network Adaptation Agent is copied to yet another agent located at a gateway, referred to herein as an Environment Mirror Agent, in a backbone network of a service provider. The service provider network then may use this information to tailor data communication sessions between the network and the respective device.

These and other advantages of the invention will be apparent to those of ordinary skill in the art by reference to the following detailed description and the accompanying drawings.

DESCRIPTION OF THE DRAWING

FIG. 4 shows is a network diagram showing handoffs between different networks and devices; and FIG. 5 is a flow chart showing one process in accordance with the principles of the present invention.

DETAILED DESCRIPTION OF THE INVENTION

Figure 1:
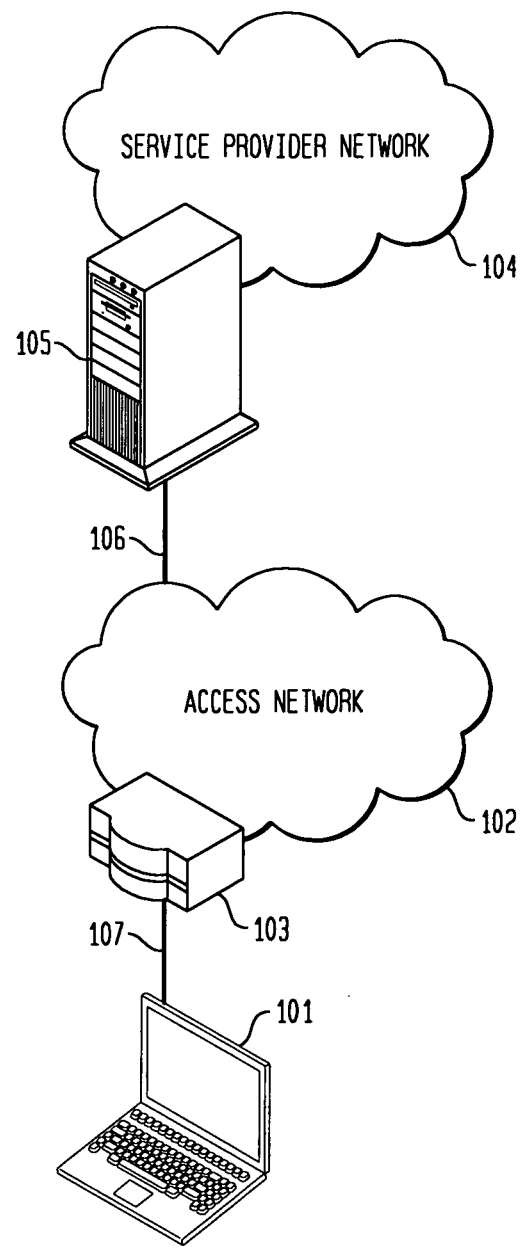
FIG. 1 shows a user device connected via an access network to a service provider's network.

FIG. 1 shows a prior simplified network having a user device connected to a service provider backbone network. Referring to that figure, user device 101, here a laptop computer, is connected to access network 102 via gateway 103. The term gateway as used herein refers to the hardware and/or software functionality through which access to a network is provided. Access network 102 may be, for example, a cable-based Internet access network and gateway 103 may be, for example, a cable modem. Access network 102 provides an interface to illustrative service provider network 104, which is for example a well-known voice over internet protocol (VoIP) network via gateway 105 which is, for example, a border element in a VoIP network. As is well known in the art, laptop computer 101 or other user devices may use such a network architecture to interface with and obtain services from service provider network 104. One skilled in the art will recognize that the architecture of FIG. 1 is merely illustrative in nature and is intended to describe any network architecture where a user device connects to a service provider network via an access network.

Figure 2:
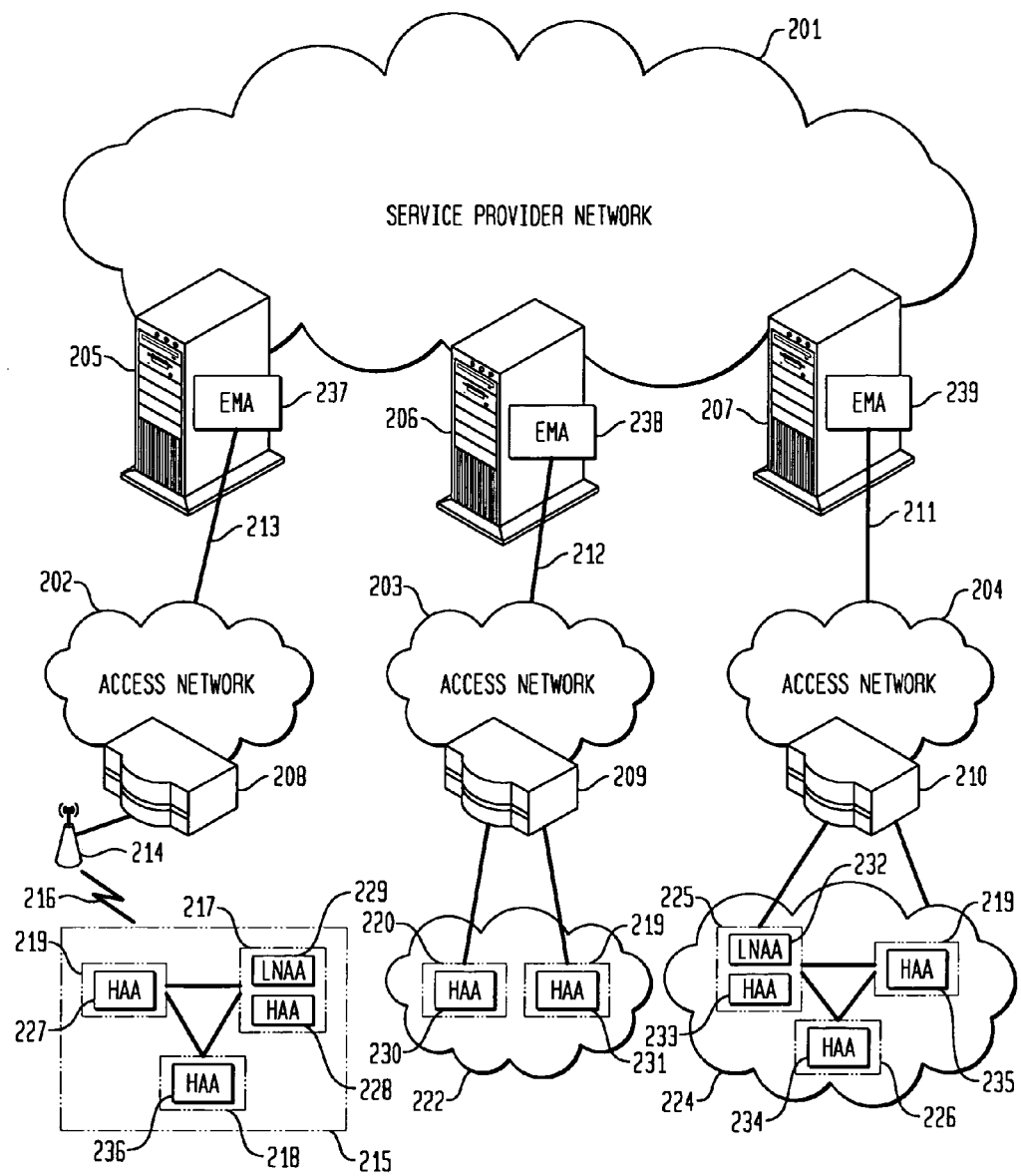
FIG. 2 shows a network in which the principles of the present invention may be implemented in which multiple networks are connected to a service provider's network via different access networks.

FIG. 2 shows an expanded network architecture in which the present invention may be implemented whereby different user devices in different sub-networks access a service provider network. For example, referring to FIG. 2, user devices in local area networks 215, 222 and 224, respectively, each connect to service provider network 201 via different access networks 202, 203 and 204, also respectively. Specifically, laptop computer 219, mobile phone 217 and display 218 are, for example, devices in network 215 which is, illustratively, an in-vehicle network. Display 218 is, for example, a display in a vehicle that is used to display various types of information such as, illustratively, navigation information using input from a well-known positioning system such as the global positioning system (GPS). Mobile phone 217 is, illustratively, connected to a cellular access network 202 via cell-tower 214 and base station 208. Access network 202 is, in turn, connected via connection 213 to gateway 205, herein referred to as an Information Gateway (IGW) in order to access services and information on service provider network 201. Here, for example, service provider network 201 is a network that provides both IP telephony services (such as VoIP telephony services), as well as data services.

FIG. 2 also shows a network 222 which is, for example, a data network in a user's home. This network has, for example, computer 220 which is connected to a cable access network 203 via gateway 209, here a cable modem. Laptop computer 219 is a network element in network 222 when it is moved from, for example, the in-vehicle network 215 into the home network 222. As before, access network 203 interfaces with the service provider network 201 via IGW 206 in order to provide computer 220 and laptop computer 219 with network services. Finally, network 224, which is an office network has office computer 225, personal digital assistant (PDA) 226 and, once again, laptop computer 219 when it is moved from network 215 into the office having network 224. Office network 224 is connected to access network 204, which is an illustrative high-speed data network via gateway 210, here a network switch/router. Access network 204 is, once again, connected to service provider network 201 via connection 211 and IGW 207 to provide services and applications to the devices in office network 224. In both networks 222 and 224, various handoffs of data streams, such as multimedia streams, are possible so that one end point of the data stream is transferred from a first device to a second device.

The devices in one of the networks 215, 222 and 224 may interact cooperatively with other devices in the same local network. In one illustrative example of such interaction, the navigation system having display 218, may be networked using the well-known Bluetooth networking protocol, or any other suitable protocol, to laptop computer 219 and mobile phone 217. Thus, for example, during navigation operations, the navigation system in the vehicle may retrieve updated traffic condition information via the data connection between mobile telephone 217 and networks 202 and 201. This traffic information can then be displayed on display 218 together with the navigation information and may be, for example, used by the navigation system associated with display 218 in planning a travel route from one point to another. Other device interaction is also possible between laptop computer 219, phone 217 and display 218. For example, since these devices are locally networked, once again illustratively using the Bluetooth protocol, it is possible for a communication session between one device to be "handed off" to another device. One example of such a handoff may occur when a multimedia stream destined to one of the devices is handed off in a way such that the stream terminates with a different device. For example, a user of laptop computer 219 may be receiving a multimedia stream, such as a movie, via the connection between the mobile phone and network 202. However, it may be desirable for the movie to be displayed to other passengers in the car by having the stream displayed on display 218. Since laptop computer 219 is networked with display 218 such a transfer can be accomplished over the in-vehicle network using known methods and the video can be displayed on display 218.

One skilled in the art will recognize that the network architecture of FIG. 2 is merely illustrative in nature. Many different architectures are possible in order to achieve the connection of the devices in networks 215, 222 and 224 to service provider network 201. For example, IGWs 205, 206 and 207 may be the same gateway. However, regardless the precise implementation, the result will be that one or more devices in various networks will be connected to a service provider network via an IGW in order to receive services from a service provider and that handoffs of data streams, such as multimedia streams, can take place among those devices.

The present inventors have realized that one limitation of prior networking handoff attempts, such as the handoff described above, is that such handoffs did not take into consideration the configuration or capability of the different devices and local networks. The present invention substantially overcomes this limitation. In particular, in accordance with the principles of the present invention, environment information concerning the devices or groups of devices in a network is collected and maintained at various levels of the network in order to facilitate the tailoring of services provided over the network. More specifically, agents are located at each user device to collect this information. When more than one device connects to an access network via a particular device in a local network, that particular device may, in one example, use an agent to maintain information about all the devices in the local network. This information is then transferred to a corresponding mirror agent at a gateway in a backbone network of a service provider where it is maintained and used by the backbone network gateway to tailor services and media streams for the individual devices in the network. More specifically, the environment information may be used in a way such that the transmission of information from or to a device occurs as a function of the configuration of a device, the network and/or the application capabilities of the device.

As used herein, an agent refers to hardware and/or software that is adapted to collect, maintain, update and transmit information related to the hardware, interface, active communication sessions and capabilities of one or more particular devices. This information is referred to herein as environment information. One skilled in the art will recognize that the hardware used in such an agent may have an illustrative processor, for example the processor in a mobile telephone, and storage media, such as computer readable memory located in a mobile telephone. One skilled in the art will recognize that this memory may be random access memory or any other type of suitable memory. One skilled in the art will also recognize that the software is software adapted to be executed on the above processor and, for example, may include database software for storing and maintaining the above information. Finally, one skilled in the art will recognize that such an implementation is merely illustrative in nature and that various hardware and software components may be adapted for equally advantageous use in a computer in accordance with the principles of the present invention.

Referring once again to network 215 in FIG. 2, laptop computer 219, mobile phone 217 and display 218 have associated agents 227, 228 and 235, respectively, referred to herein as Home Adaptation Agents (HAAs). Similarly device 220 in network 222 has HAA 230 and devices 225 and 226 in network 224 have HAAs 233 and 234, respectively. As discussed above, these agents are hardware and software agents located on each device in the network. These HAAs maintain environment information and detect changes related to that information. For example, when a device is turned on or otherwise initialized, the HAA for that particular device will query the device to determine the environment information pertaining to that device and then will store that information in the aforementioned database. The HAA for each device will then monitor the device and will update the environment information for the device when it changes.

In some local networks, one device may be selected as a local network gateway (LNG) device In network 215 of FIG. 2, for example, mobile phone 217 is used as such an LNG. While each device in network 215 may have interfaces to support a connection with an access network, if desired the LNG may be used to provide external connectivity for all devices in the local network, such as local network 215, to an access network, such as access network 202. If such an LNG is used, then an additional agent, referred to herein as Local Network Adaptation Agent (LNAA), may be used to collect the configuration that is maintained by each HAA for the devices in the network. Within a Local Area Network, there is illustratively only one LNAA that can take over the agent functions of the HAAs at the devices. For example, in networks 215 and 224, devices 217 and 225 each act as LNGs for those networks and, accordingly, have LNAAs 228 and 232, respectively. When a device enters one of the networks 215 or 224, the LNAA queries the HAA of the entering device and collects the information maintained by the HAA. Similarly, when a device is in an active communication session, the environment information in the LNAA is updated to reflect the current session information for that device. In this way, cumulative device environment information is maintained at both the device as well as the LNG connecting that device to an external access network. In contrast to the LNAAs used in networks 215 and 224, network 222 does not use an LNAA and, therefore, the HAA at each device will maintain the environment information independently.

Regardless whether an LNAA is used or only HAAs are used to collect and maintain device environment information in the network, in accordance with the principles of the present invention, the information collected by these agents is forwarded and mirrored at an additional agent at the IGW in the service provider network, herein referred to as an Environment Mirror Agent (EMA). The EMA is co-located with the IGW and provides the IGW with information necessary to respond to environment changes to tailor communications between the IGW and the devices in networks 215, 222 and 224. In one illustrative embodiment, when a device enters or leaves, for example, network 215, as discussed above, the LNAA at LNG device 217 will be updated. Such an update will also be made any time the environment information for a device changes. Once updated, the LNAA will then transmit that information via access network 202 to the EMA at IGW 205. Similarly, LNAA 232 in network 224 will transmit environment information for devices in that network to the EMA located at IGW 207 in network 201. However, since the devices in network 222 do not use an LNAA to consolidate the information for devices 220 and 219, the HAAs 230 and 231 will maintain device-specific environment information and will forward that information separately to the EMA at IGW 206. Accordingly, the end result is that environment information is collected at each device and is shared throughout the local and backbone networks.

Figure 3:
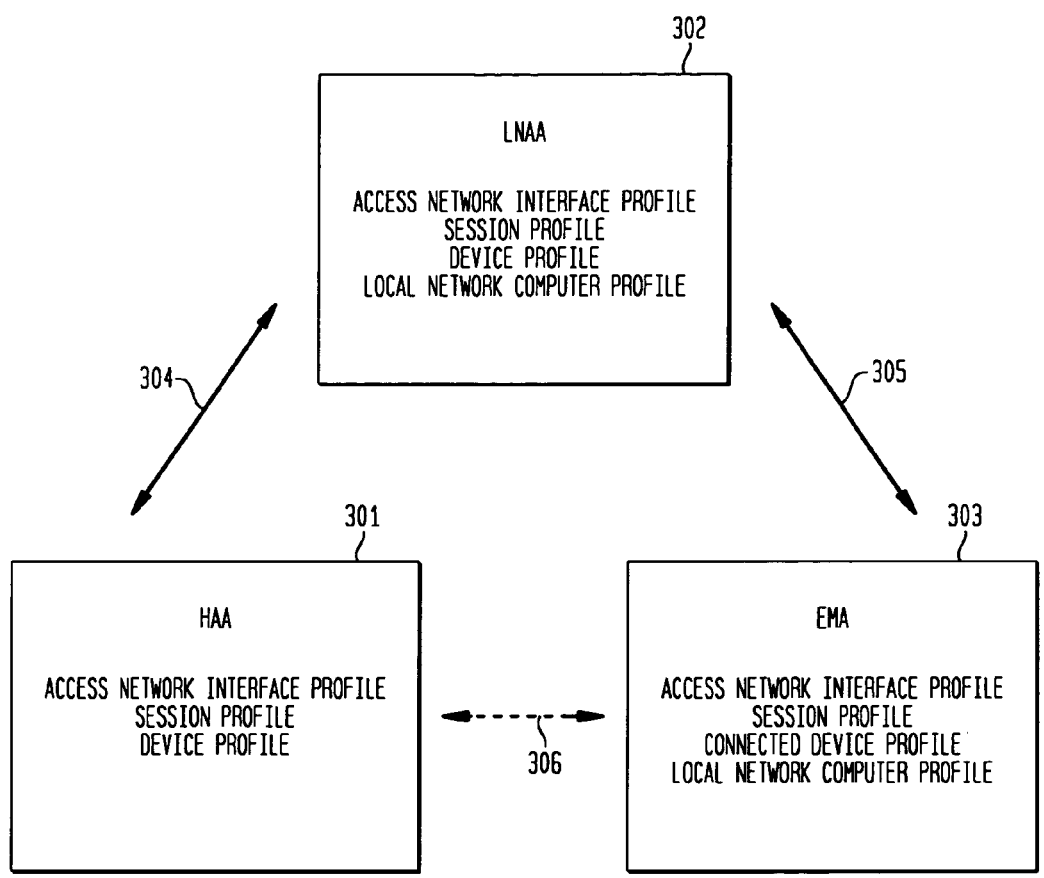
FIG. 3 shows how agents at different levels of the network of FIG. 2 interact to transfer data between the agents.

FIG. 3 is a block diagram showing a generic data flow between the various agents in the network. Specifically, as discussed above, when a device is turned on or otherwise initialized, the HAA 301 at that device collects interface information as well as other device information, including whether any communications sessions are currently active. When this information changes, then that information is updated at the HAA 301. This information is then transmitted via path 304 to a corresponding LNAA, if one is available. If not, then the HAA 301 transmits data via path 306 directly to EMA 303. If an LNAA, such as LNAA 302, is used then that LNAA collects the data from HAA 301 as well as from all HAA's in the corresponding network and then transmits that data via path 305 to EMA 303.

By using the foregoing agents to collect and maintain environment information related to devices or groups of devices in a network, it is possible to tailor the data being transmitted to those devices, for example, when a handoff occurs between devices or when a device moves from one network to another. For example, referring to FIG. 4, once again laptop computer 219 is initially present in network 215 which is, as discussed above, an illustrative in-vehicle network. When laptop 219 is turned on, the environment information, including hardware, software and network interface information is collected at HAA 227 corresponding to laptop 219 and is then transmitted to LNAA 229 at device 217, as discussed above. This information is then transmitted, as also discussed above, to EMA 237 at IGW 205. The environment information is then used to tailor services provided to device 219. For example, if a service provided by network 201 requires streaming multimedia information, such as a combined audio and video stream, the IGW 205 will know the capabilities of laptop computer 219 and will, therefore, be able to send the appropriate format media to laptop 219. For example, once again assume laptop 219 is connected to network 201 via mobile telephone 217 and access network 202 and further assume that access network 202 is a CDMA cellular network. The processing capabilities of laptop 219 and application preferences of the user of that laptop are known at the EMA of IGW 205. Therefore, in preparing to transmit the multimedia stream to laptop computer 219, IGW 205 can adapt the stream to the capabilities and preferences of that device. For example, since the access network is a relatively low-bandwidth CDMA network, IGW could send a relatively low data rate MPEG encoded stream, for example, an MPEG-1 video stream with a two channel audio stream. MPEG-1 is a well known encoding standard for multimedia data streams including audio and video streams and will not be described further herein. One skilled in the art will recognize that various MPEG encoded streams can be higher or lower in data rates and, therefore, differ in bandwidth requirements. For example, MPEG-2 encoded data stream uses less compression and, therefore, is more bandwidth intensive than, say, an MPEG-1 or MPEG-4 encoded stream.

Assume now, as discussed above, that it is desired to display the multimedia stream to other passengers in the car via display device 218 via a handoff to that display device, illustratively shown in FIG. 4 as arrow 401. Also assume that the display device is connected to a sound system in network 215 that is capable of playing six discrete channels of audio. As a result, when the user of laptop computer 219 indicates that a handoff is desired, the IGW 205 will receive the indication and, in response, will determine the capabilities of display device 218 and the associated audio system by referring to the EMA associated with IGW 205. One skilled in the art will recognize that a user may indicate a handoff is desired by sending an explicit request or may, optionally, select to automatically initiate a hand off whenever a particular device is activated. Thus, in this fashion, the user may either explicitly request that the multimedia stream be forwarded to display device 218 or, alternatively, when display device 218 is turned on, the user could have a predetermined preference stored in the EMA associated with IGW 205 to forward any multimedia streams to that display.

In response to the indication that a handoff is desired, the EMA 237 will, illustratively, still send an MPEG-1 video stream due to the relatively low-bandwidth offered by the CDMA network 202, but will substitute a six channel audio stream for the two channel stream sent to laptop 219. Thus, the multimedia stream is tailored to the particular device or devices used.

In another example in accordance with the principles of the present invention, assume laptop 219 leaves network 215 and transfers to network 222, shown illustratively by arrow 402, which is once again an illustrative home network. This transfer could occur, for example, when the laptop 219 is moved from a vehicle into a home. At this time, the LNAA in network 215 and EMA 237 at IGW 205 will remove the environment information related to laptop 219. When laptop 219 enters network 222, since there is no LNAA in network 222, the HAA 227 in laptop 219 will transmit environment information directly to the EMA 238 at IGW 206 in network 201 via access network 203. One skilled in the art will recognize that, IGW 206 could be the same IGW as IGW 205. In such a case, the environment information will be updated to reflect the new network capabilities and/or user preferences to be applied to services when laptop 219 is located in network 222. For example, assume once again that network 203 is a relatively high bandwidth data network, such as a cable Internet access network. Therefore, when a request for service is received at IGW 206, a higher data-rate media stream, for example, could be transmitted successfully to laptop 219 than that capable of being transmitted across network 202. Thus, for example, when IGW 206 receives a request for a service that requires a multimedia stream, IGW 206 could select to provide a stream using the high-quality MPEG-2 video encoding format.

In a final example of how such handoffs may occur, laptop 219 could be transferred to office network 224, shown illustratively by arrow 403. Once again, the EMA 238 at IGW 206 will be updated to reflect that laptop 219 is no longer present in network 222 and the EMA 239 at IGW 207 will be updated with the environment information from the HAA 227 of laptop computer 219, including the information related to associated access network 204. Assume that, once again, a multimedia session is initiated between service provider network 201 and laptop computer 219 in network 224. Also assume that access network 204 is a well known high-bandwidth access network that uses, for example, a T3 line capable of delivering data across the network at high speed. As a result, when the multimedia session is initiated, IGW 207 will select a high-quality high-bandwidth requirement multimedia stream, such as the aforementioned MPEG-2 video stream. Now, for example, assume that a request for a handoff from laptop computer 219 to PDA 226 is received at IGW 207. As one skilled in the art will recognize, PDA 226 will typically not have as robust hardware configuration (e.g., processor, memory, etc) as does a laptop computer, such as laptop computer 219. Therefore, when a handoff to that device, shown illustrative by arrow 404, is requested, IGW 207 will refer to the environment information associated with the PDA 226 that is stored in EMA 239 associated with IGW 207 and transmit a lower bandwidth video and audio stream if required. Therefore, for example, the IGW will change the video stream to a well-known Windows Media-encoded video stream. Thus, by monitoring and updating device information at each device, at a local gateway and at a gateway in a backbone network, multimedia and other data sessions may be adapted to best accommodate the device and network capabilities.

FIG. 5 shows a flowchart in accordance with the principles of the present invention in which the above handoffs may be performed. At step 501, a device, such as laptop 219 in FIG. 4, is initialized/turned on in a network, such as network 215 in FIG. 4. Then, at step 502, environment information related to that device is detected, as described above, and is stored in an HAA at that device. At step 503 a determination is made whether a local network gateway, or LNG, is present in the network. If so, at step 504, the device information is stored in an LNAA associated with the LNG. Then, at step 505, the environment information is transmitted to an EMA at an IGW in a service provider's network and, at step 506, the environment information is used to tailor data streams transmitted to the device when, for example, an active data stream is handed off to that device.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transferring an active communication session with a first device to a second device, wherein configuration information of said first device and said second device is stored in an environment mirror agent at a gateway in a backbone network, said method comprising:

maintaining the configuration information in a local network adaptation agent for each device of the first and second devices;
transmitting the configuration information for the first device and the second device to the environment mirror agent;
determining that a transfer of said active communication session from said first device to said second device is desired; and
transferring said active communication session to said second device and adapting said active communication session as a function of the configuration information for said second device stored in the environment mirror agent, wherein the environment mirror agent mirrors the local network adaptation agent, said environment mirror agent used by said gateway to tailor communication with said plurality of devices, and said configuration information for said first device and said configuration information for said second device comprise a device profile, an interface profile and an application profile.

2. The method of claim 1 further comprising the step of modifying a first parameter of said communication session as a function of said configuration information for said second device.

3. The method of claim 2 wherein said first parameter comprises the data rate of said communication session.

4. An apparatus for transferring an active communication session with a first device to a second device, said apparatus comprising:
a processor in said first device;
a first storage device for storing configuration information for said first device;
a second storage device for storing configuration information for said second device;
a first local network agent maintaining the configuration information for the first device;
a second local network agent maintaining the configuration information for the second device; and
home adoption agents transmit the configuration information for the first and the second devices to an environment mirror agent at an information gateway; wherein the information gateway determines that a transfer of said active communication session from said first device to said second device is desired and
transfers said active communication session to said second device and adapts said active communication session as a function of said configuration information for said second device stored in the environment mirror agent, wherein the environment mirror agent mirrors said second local network agent, said environment mirror agent used by said gateway to tailor communication with said plurality of devices and said configuration information for said first device and said configuration information for said second device comprise a device profile, an interface profile and an application profile.

5. The apparatus of claim 4 wherein said information gateway transmits said configuration information for said first device and said configuration information for said second device to a second gateway.

6. The apparatus of claim 4 wherein the information gateway modifies a first parameter of said communication session as a function of said configuration information for said second device.

7. The apparatus of claim 6 wherein said first parameter comprises the data rate of said communication session.

8. The apparatus of claim 4 wherein said first storage device and said second storage device comprise the same storage device.

9. The apparatus of claim 8 wherein said same storage device comprises a database stored in computer memory.

* * * * *

UNITED STATES PATENT AND TRADEMARK OFFICE
CERTIFICATE OF CORRECTION

PATENT NO.         : 8,527,611 B2
APPLICATION NO.    : 11/135169
DATED              : September 3, 2013
INVENTOR(S)        : Chennikara-Varghese et al.

Page 1 of 1

It is certified that error appears in the above-identified patent and that said Letters Patent is hereby corrected as shown below:

Title Page (56), under "OTHER PUBLICATIONS", in Column 2, Line 1, delete "et al," and insert -- et al., --, therefor at each occurrence throughout the Other Publications.

Title Page (56), under "OTHER PUBLICATIONS", in Column 2, Line 4, delete "Sundt Roy" and insert -- Sumit Roy --, therefor.

In the Specification

In Column 2, Line 56, delete "DESCRIPTION OF THE DRAWING" and insert -- BRIEF DESCRIPTION OF THE DRAWINGS --, therefor.

In the Claims

In Column 10, Line 3, in Claim 4, delete "adoption" and insert -- adaptation --, therefor.

Signed and Sealed this
Fourteenth Day of April, 2015

Michelle K. Lee
*Director of the United States Patent and Trademark Office*